United States Patent [19]
Eneboe

[11] Patent Number: 5,812,875
[45] Date of Patent: Sep. 22, 1998

[54] APPARATUS USING A STATE DEVICE AND A LATCHING CIRCUIT TO GENERATE AN ACKNOWLEDGEMENT SIGNAL IN CLOSE PROXIMITY TO THE REQUEST SIGNAL FOR ENHANCING INPUT/OUTPUT CONTROLLER OPERATIONS

[75] Inventor: Michael K. Eneboe, San Jose, Calif.

[73] Assignee: Apple Computer, Inc., Cupertino, Calif.

[21] Appl. No.: 432,803

[22] Filed: May 2, 1995

[51] Int. Cl.$^6$ ............................................ G06F 13/00
[52] U.S. Cl. ...................... 395/840; 395/310; 395/821; 395/825; 395/882
[58] Field of Search ................................ 364/132, 189.05; 395/464, 500, 860, 200.05, 285, 729, 741, 310, 821, 825, 840, 882; 340/825.51; 375/354

[56] References Cited

U.S. PATENT DOCUMENTS

| | | | |
|---|---|---|---|
| 4,533,994 | 8/1985 | Harrill et al. | 395/860 |
| 4,819,149 | 4/1989 | Sanik et al. | 364/132 |
| 5,068,785 | 11/1991 | Sugiyama | 395/285 |
| 5,070,443 | 12/1991 | Priem et al. | 395/285 |
| 5,159,683 | 10/1992 | Lvovsky et al. | 395/500 |
| 5,179,705 | 1/1993 | Kent | 395/729 |
| 5,235,697 | 8/1993 | Steely, Jr. et al. | 395/464 |
| 5,265,051 | 11/1993 | Jeong | 364/189.05 |
| 5,327,121 | 7/1994 | Antles, II | 340/825.51 |
| 5,353,429 | 10/1994 | Fitch | 395/445 |
| 5,408,678 | 4/1995 | Kato et al. | 395/800 |
| 5,422,914 | 6/1995 | Snyder | 375/354 |
| 5,430,879 | 7/1995 | Murai | 395/741 |
| 5,524,236 | 6/1996 | Ostrowski | 395/500 |
| 5,548,767 | 8/1996 | Langendorf | 395/200.05 |
| 5,586,248 | 12/1996 | Alexander et al. | 395/182.2 |

OTHER PUBLICATIONS

"X3T9.2/855D, Revision 12b, Jun. 7, 1993, Reference No. ISO/IEC; 199x/ANSI X3.199x", printed Jun. 11, 1993, pp. i–ix and 1–65.

*Primary Examiner*—Thomas C. Lee
*Assistant Examiner*—Po C. Huang
*Attorney, Agent, or Firm*—Burns, Doane, Swecker & Mathis, L.L.P.

[57] ABSTRACT

The present invention is directed to improving the time with which information transfer signals can be generated in response to an initiating signal. Exemplary embodiments are described in the context of a small computer system interface, wherein enhanced operation is achieved by producing a response signal, such as an acknowledge signal, in close proximity to receipt of an initiating signal, such as a request signal. Further, exemplary embodiments achieve such improved operation without the use of complex circuitry; rather, relatively simple latching circuitry is provided in accordance with the present invention to substantially increase overall operating efficiency.

20 Claims, 4 Drawing Sheets

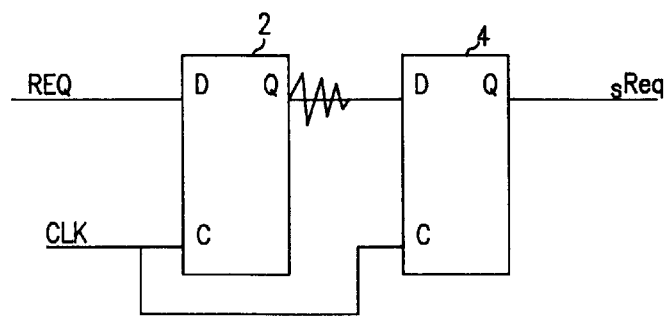
FIG. 1
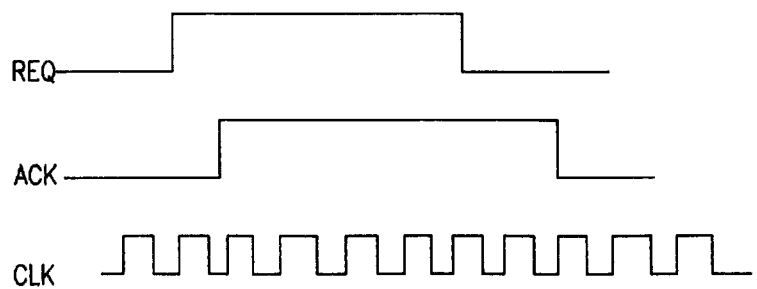
FIG. 2A
FIG. 2B
FIG. 2C

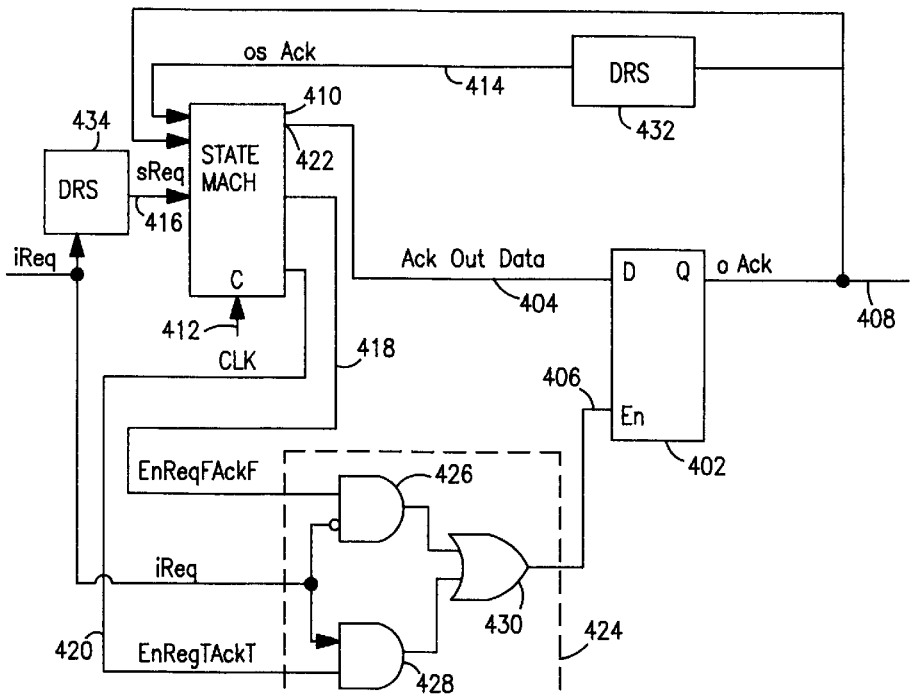
FIG. 4
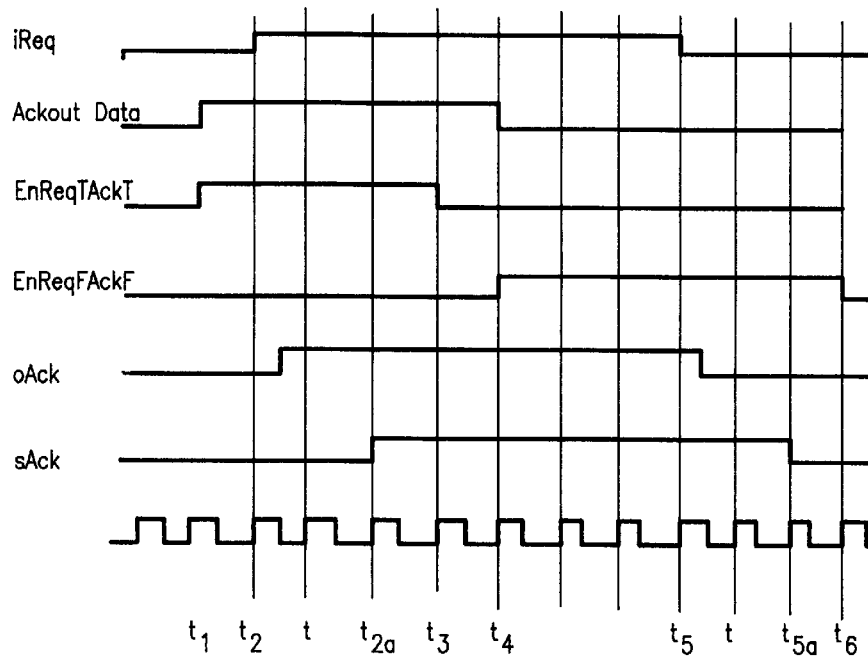
FIG. 5A
FIG. 5B
FIG. 5C
FIG. 5D
FIG. 5E
FIG. 5F
FIG. 5G

APPARATUS USING A STATE DEVICE AND A LATCHING CIRCUIT TO GENERATE AN ACKNOWLEDGEMENT SIGNAL IN CLOSE PROXIMITY TO THE REQUEST SIGNAL FOR ENHANCING INPUT/OUTPUT CONTROLLER OPERATIONS

BACKGROUND OF THE INVENTION

1. Field of the Invention

The present invention relates generally to the operation of input/output (I/O) controllers, and more particularly, to a method and apparatus for enhancing the operation of such devices.

2. State of the Art

Input/output controllers are widely used in computer system architectures for interfacing a first device, such as a main controller, with one or more peripheral devices. For example, small computer system interfaces (SCSI) are known input/output controllers used to transfer information between a main controller and one or more peripheral devices connected to their local bus.

Information is transferred on the local bus of the input/output controller between two devices at any given time. The devices connected to the local bus can be any combination of initiator devices (that is, devices which request another device to perform a specified process) and target devices (that is, devices which execute the process requested by the initiator device) provided there is at least one initiator device and one target device at any given time. Each device connected to the local bus has an address and corresponding identification bit assigned to it such that one device can act as an initiator device and the other can act as a target device. The peripheral devices connected to the local bus can include memory devices (e.g., disk drives, tape drives, and so forth), printers or any other intelligent or non-intelligent device.

Small computer system interface devices can provide both synchronous and asynchronous transfers of information using information transfer (e.g., handshaking) signals. For example, standardized request and acknowledge handshake signals of a small computer system interface are set forth in the SCSI-2 ANSI document X3.131-1994 (SCSI-2) and in the working draft of the document entitled "X3T9.2/855D, Revision 12b, Jun. 7, 1993, Reference No. ISO/IEC; 199x/ANSI X3.199x". These documents set forth the standard for defining mechanical, electrical and timing requirements of SCSI-2 and SCSI-3 parallel interfaces for use with the SCSI-2 and SCSI-3 Interlocked Protocol Standards, the contents of which are hereby incorporated by reference in their entireties.

The request signal is typically sourced by a target device to indicate a request for an information transfer on the local bus. The acknowledge signal is typically sourced by an initiator device as a response which verifies acknowledgement of the request. Each of these signals can have either an asserted (e.g., TRUE) state or a negated (e.g., FALSE) state. Signals that are asserted can be actively driven to the TRUE state, while signals that are negated may either be actively driven to a FALSE state or released to a FALSE state. A signal that is released goes to the FALSE state because the bias of a cable terminator pulls the signal false. Any device driver of a small computer system interface controller that is not active is placed into a high-impedance state.

Information transfers on the local bus of the small computer system interface follow a defined request/acknowledge transaction (RAT). According to the small computer interface standard, request/acknowledge transactions can be used for any information transfer service, including, for example, command, status, message-out, message-in, data-out and data-in services. A request/acknowledge transaction can be either asynchronous or synchronous depending on a request/acquisition offset value. An offset value of zero specifies an asynchronous transfer while non-zero offset value specifies a synchronous transfer.

An exemplary asynchronous information transfer from a target device to an initiator device can be performed by the target device first asserting data bus signals to a desired value and then asserting the request signal. The data bus signals remain valid until the acknowledge signal is TRUE at the target device. The initiator device reads the data bus signals after the request signal is TRUE, and then asserts the acknowledge signal. When the acknowledge signal becomes TRUE at the target device, the target device can change or release the data bus signals and then negate the request signal. After the request signal is FALSE, the initiator device negates the acknowledge signal.

For asynchronous transfer from the initiator device to the target device, the target device requests information by asserting the request signal. The initiator device drives data and parity signals to their desired values, then asserts the acknowledge signal. The initiator device continues to drive the data and parity signals until the request signal from the target device is FALSE. The target device does not negate the request signal until the acknowledge signal becomes TRUE at the target device and data and parity signals have been read. Once the request signal becomes FALSE at the initiator device, the initiator device can change or release the data and parity signals, and then negate the acknowledge signal.

Having described asynchronous information transfer in a small computer system interface, a brief discussion of synchronous data transfer will be provided. During synchronous data transfers, the request or acknowledge pulse is a transition of a request or acknowledge signal from a FALSE to TRUE and back to FALSE condition. The initiator device detects a request pulse after the transition of the request signal from FALSE to TRUE. The target device detects an acknowledge pulse after the transition of the acknowledge signal from FALSE to TRUE.

Synchronous data transfers allow noninterlocked data transfers between an initiator device and a target device after the first request pulse and before the request/acknowledge offset is reached. The target device generates request pulses independent of the acknowledge pulses until the request/acknowledge offset is reached. The initiator device generates acknowledge pulses independent of the request pulses until the number of acknowledge pulses equals the number of request pulses detected.

The request/acknowledge offset specifies the maximum number of request pulses that can be sent by a target device in advance of the number of acknowledge pulses received from the initiator device, thereby establishing a pacing mechanism. If the number of request pulses exceeds the number of acknowledge pulses by the request/acknowledge offset, the target device cannot assert the request signal until after the leading edge of the next acknowledge pulse is received. A requirement for successful completion of a data service is that a number of acknowledge and request pulses be equal.

Signal outputs, such as the request and acknowledge signal outputs, are typically formed as single-ended outputs which use either passive-negation or active-negation drivers. Passive-negation drivers implemented using an open-collector or an open-drain circuits have two states: asserted and high-impedance. Active-negation drivers have three states—asserted, negated and high-impedance—and are typically used for handshaking signals such as the acknowledge and request signals.

Input/output controllers, such as small computer system interfaces, typically do not include an internal clock. To control the state of their local bus, these controllers include some form of state machine which is clocked by the main controller's clock, and which is used to control an information transfer by monitoring the sending and receipt of the handshaking signals. Because the state machine is clocked by an external clock signal, such as that of the main controller, inputs to the state machine (such as the handshaking signals) must be synchronized to that clock before being supplied to the state machine. Accordingly, handshaking signals (such as the request and acknowledge signals) which are used during both synchronous and asynchronous information transfer modes are typically supplied to synchronizing logic before being supplied to the state machines. For example, an initiator device will typically use a dual rank synchronizer to sample a request signal for input to a state machine which generates the acknowledge signal in response. A dual rank synchronizer circuit as illustrated in FIG. 1.

FIG. 1 illustrates a dual rank synchronizer formed with two serially connected flip-flops. For a small system computer interface operating in an initiator mode, a request signal received from a target device is supplied to the D input of the first flip-flop 2. To minimize the probability of meta-stability in the sampled request signal, the output from the first flip-flop 2 is supplied to the D input of a second flip-flop 4. Both the flip-flops 2 and 4 are clocked by the system clock. In clocking the request signal from the output of the first flip-flop 2 to the input of the second flip-flop 4, it is assumed that meta-stabilities will be resolved in a synchronized request signal output from the second flip-flop 4.

Meta-stability in the request signal can, for example, occur if the request signal is received at the first flip-flop 2 at the same time a clock pulse is received at the clock input of this flip-flop. These meta-stabilities are represented as oscillations in the output of the first flip-flop and, as illustrated in FIG. 1, eventually damp to a steady-state value before being clocked to the second flip-flop 4.

Although a dual rank synchronizer as illustrated in FIG. 1 can be used to resolve meta-stabilities of an input signal, this circuit imposes a minimum two clock period delay on production of the synchronized request signal. FIG. 2A illustrates an exemplary request signal which is clocked into a first flip-flop 2 on the occurrence of a first clock pulse of FIG. 2C. On a second clock pulse, the synchronized request signal is produced at the output of the second flip-flop 4, from which the acknowledge signal of FIG. 2B can be generated. Thus, the acknowledge signal is generated with a two clock period delay relative to initial receipt of the request signal.

A similar two clock period delay is incurred on deassertion of the request signal and the acknowledge signal. That is, upon seeing deassertion of the request signal, the initiator device deasserts the acknowledge signal with a minimum two clock period delay.

Similar delays are incurred when the small computer system interface operates in the target mode. For example, a two clock period delay is incurred between the time an acknowledge signal is detected and the time a request is deasserted.

Accordingly, it would be desirable to improve the response time with which an input/output controller can generate an information transfer response signal. For example, it would be desirable to reduce the two-clock period delay a small computer system interface incurs between the generation of an acknowledge signal upon receiving a request signal from a target device. Further, it would be desirable to achieve such improved operation without substantially increasing circuit complexity.

SUMMARY OF THE INVENTION

The present invention is directed to improving the time with which information transfer signals can be generated in response to an initiating signal. Exemplary embodiments are described in the context of a small computer system interface, wherein enhanced operation is achieved by producing a response signal, such as an acknowledge signal, in close proximity to receipt of an initiating signal, such as a request signal. Further, exemplary embodiments achieve such improved operation without the use of complex circuitry; rather, relatively simple latching circuitry is provided in accordance with the present invention to substantially increase overall operating efficiency.

In accordance with exemplary embodiments, a method and apparatus are provided for controlling a transfer of information between a controller and at least one peripheral device. In accordance with exemplary embodiments, an apparatus includes at least two signal lines for sending and receiving at least first and second information transfer signals during a transfer of information between the controller and the at least one peripheral device, said second information transfer signal being generated in response to said first information transfer signal; a state machine for receiving at least one of said information transfer signals as an input, and for generating at least one latch enable signal in response to said at least one information transfer signal; and a latching circuit for producing said second information transfer signal in response to said latch enable signal.

BRIEF DESCRIPTION OF THE DRAWINGS

The present invention can be further understood with reference to the following description and the appended drawings, wherein like elements are provided with the same reference numerals. In the drawings:

FIG. 1 is a conventional dual rank synchronizer circuit;

FIGS. 2A–2C illustrates a timing diagram which shows an exemplary request and acknowledge signal sequence;

FIG. 4 is an exemplary embodiment of a latch circuit in accordance with the present invention;

FIGS. 5A–5G illustrate a timing diagram associate with the FIG. 4 latch circuit.

DETAILED DESCRIPTION OF THE PREFERRED EMBODIMENTS

Figure 3:
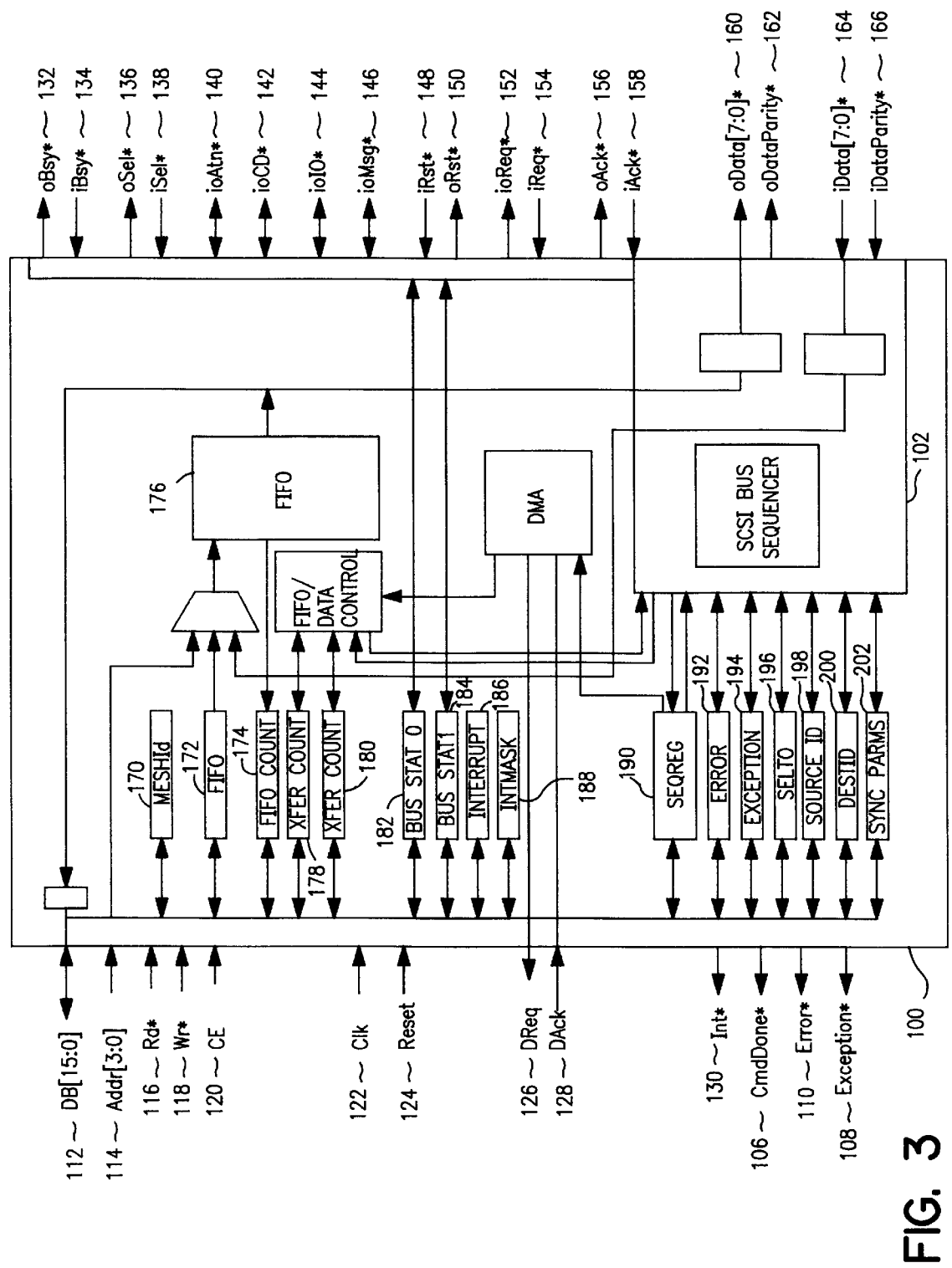
FIG. 3 is an exemplary embodiment of a small computer system interface in accordance with the present invention.

FIG. 3 illustrates an exemplary embodiment of a first controller which can, for example, be used as a peripheral device interface for a second controller. For purposes of illustrating features of the present invention, the first controller is represented in FIG. 3 as an input/output controller, in particular, a small computer system interface (SCSI) formed as a monolithic integrated circuit. The first controller of FIG. 3 communicates over a first main bus with the second controller, referred to herein as a main, or host controller (not shown). The first controller interfaces the main controller to one or more devices connected to a second, local bus of the first controller.

Those skilled in the art will appreciate that the first controller can either initiate an input/output process requested by the main controller (initiator mode) or respond to a request from a device on the local bus to perform an input/output process (that is, serve as a target in a target mode).

Where the first controller is a small computer system interface, distributed arbitration can be included as bus contention logic for the local bus. A priority system can be used to award control to the highest priority device requesting access to the first controller's local bus in any known fashion.

Although the exemplary FIG. 3 embodiment of a first controller is described in the context of a small computer system interface, it will be appreciated that such an embodiment is by way of illustration only. The present invention is not limited to enhancing operation of small computer system interfaces; rather, those skilled in the art will appreciate that advantages of the present invention can be realized for any controller used as an interface. For example, the invention is equally applicable to network interface controllers, such as ethernet controllers, which control access of a device to a network.

Further, those skilled in the art will appreciate that features of the present invention are applicable to any protocol-based controller which uses a single signal line for bidirectional control signals, such as information transfer signals. For example, the invention is equally applicable to serial interfaces which toggle signal lines through various handshaking signal states. Further, the entire device of FIG. 3 need not be formed as a single monolithic integrated circuit, but rather any number of separately formed integrated or non-integrated devices can be used for any of the subcomponents illustrated in FIGS. 2A–2C. For example, those skilled in the art will appreciate that any of the components shown, such as the controller bus sequencer and/or the bus signal drivers, can be formed as separate integrated or non-integrated circuits.

To better illustrate features of the present invention, the exemplary FIG. 3 embodiment shows a first controller 100 which includes two general components: a controller bus sequencer 102; and a microprocessor/direct memory access (DMA) interface. All components other than the controller bus sequencer can be considered the microprocessor/direct memory access interface for receiving information from the main controller via data bus 112 of a first main bus.

The controller bus sequencer includes a processor for executing each command of a transaction requested by the main processor. A transaction can include one or more operations, or commands, which the first controller must execute to complete an information transfer operation. For example, a transaction can include an initial command for the first controller to arbitrate for access to its local bus, followed by a selection command to select a destination for the information transfer, followed by an information transfer command. Upon completing execution of each command in a transaction, the first controller transmits status information to the main controller via the microprocessor/direct memory access interface. The controller bus sequencer also monitors the first controller's operation and bus status. Using this information, the bus sequencer generates the status signals which are sent to the main controller.

As described in commonly assigned, co-pending U.S. patent application Ser. No. 08/432,818 filed May 2, 1995, now U.S. Pat. No. 5,689,725 entitled "METHOD AND APPARATUS FOR ACCELERATING OPERATION OF AN INPUT/OUTPUT CONTROLLER", the disclosure of which is hereby incorporated by reference in its entirety, the operation status transmitted by the first controller to the second controller is selected from among a group of status responses which include:

(1) supplying a first output signal, designated herein as a Command Done signal, to the second controller on a Command Done signal line 106, the Command Done signal being indicative of the first controller 100 having completed execution of a requested operation;

(2) supplying the Command Done signal and a second output signal, designated herein as an Exception signal on an Exception signal line 108, the Exception signal being indicative of an acceptable but undesired condition, such as a loss of arbitration or a mismatch between an expected phase of the second bus and the actual phase of the second bus, during execution of the requested operation; and (3) supplying the Command Done signal and a third output signal, designated herein as an Error signal on Error signal line 110, the Error signal being indicative of an unacceptable error condition during execution of said operation.

Each of the Command Done, Exception and Error signal lines are supplied to the second controller such that the second controller can monitor them without the use of a hardware interrupt.

Where the first controller is a small computer system interface, the Error signal can, for example, be asserted in response to violations of the standardized small computer system interface protocol. A SCSI-3 parallel interface standard is described in the working draft of the document "X3T9.2/855D, Revision 12b, Jun. 7, 1993, reference number ISO/IEC: 199x/ANSI X3.199X", setting forth the standard for defining mechanical, electrical and timing requirements of a SCSI-3 parallel interface in conjunction with the SCSI-3 Interlocked Protocol Standard, the contents of which are hereby incorporated by reference in their entirety.

Aside from supplying the Command Done, Exception and Error signals, operation of the first controller 100 in FIG. 3 will be apparent to those skilled in the art and further description thereof is unnecessary. However, general operation of the first controller 100 will be provided to assist in better understanding aspects of the present invention.

In the exemplary FIG. 3 embodiment, the local bus of the first controller will transition through various phases during execution of a transaction. For example, the local bus of a small computer system interface can transition between bus phases which include a bus free phase, an arbitration phase, a selection phase, a reselection phase, a set-up phase, and one or more information transfer phases (such as, a command phase, a data-in phase, a data-out phase, a status phase, a message-in phase and a message-out phase). Such phases are described in the previously mentioned document "X3T9.2/855D revision 12b" for information transfer on the local bus between any two devices connected thereto. Whenever two devices communicate on the local bus of the first controller, one such device operates in an initiator mode while the other device operates in a target mode.

In the exemplary FIG. 3 embodiment, wherein the first controller 100 is configured as a small computer system interface, the left hand side of the first controller represents the first, main bus for interfacing with the main controller. The main bus includes a data bus 112 (for example, a 16-bit bus) as a bidirectional data bus for interconnecting the first controller 100 with the main controller. The data bus 112 can be used for direct memory access and register access. An associated address bus 114 (for example, 4-bit bus) supplies address information from the main controller to the first controller 100.

The first controller also receives a read signal line 116, a write signal line 118 and a chip enable signal line 120 from the main controller. The read signal line is used during the reading of internal registers in the first controller, while the write signal line is used to write internal registers of the first controller. The chip enable signal line is used to access internal registers in response to address signals included on the 4-bit address line 114. A clock signal line 122 supplies a clock input, such as a 50 megahertz clock input. A reset signal line 124 supplies a reset signal to the first controller.

The first controller also includes information transfer (that is, handshaking) signal lines for direct memory access (DMA) transfer. A DMA request signal line 126 is used by the first controller to indicate when the first controller is ready to transfer data to the main controller during a DMA transfer. A DMA acknowledge signal line 128 is an input signal line to the first controller which indicates when a DMA interface is ready to transfer data to the first controller. When the signal line 126 or 128 is enabled, accesses to a FIFO register 172 by the main controller, or by any peripheral device connected to the first controller's local bus, are disabled.

The interrupt signal line 130 can be used in conjunction with the Command Done, Exception and Error status signals. In accordance with exemplary embodiments, the interrupt signal line 130 can be used to supply an interrupt signal to the main controller upon completion of a transaction or, if desired, upon occurrence of an error or exception (that is, whenever an interrupt register 186 is non-zero and an appropriate bit has been set in an interrupt mask register 188).

The right hand side of the exemplary first controller shown in FIG. 3 represents the local bus of the first controller. The local bus can, for example, be a peripheral device bus which is connected to one or more peripheral devices, such as memory devices (e.g., disk drives, tape drives and so forth), printers or any other intelligent or non-intelligent device. Those skilled in the art will appreciate that where the first controller is a network interface, the second bus can be a network communication link, such as a network bus or wireless link.

The first controller 100 includes an output busy signal line 132 which is asserted by the first controller when it has control of the second bus, and an input busy signal line 134 which is asserted by a peripheral device when acting as a target device which has control of the second bus. An output selection signal line 136 is asserted by the first controller when it selects a destination device, and an input selection signal line 138 is asserted by a peripheral device connected to the second bus for selecting the first controller as a destination. A bidirectional attention signal line 140 provides a signal which is used to monitor phase mismatches of the second bus, and generate an Exception signal.

A bidirectional control/data (CD) signal line 142, bus input/output (I/O) signal line 144, and bus message signal line 146 are used in known fashion to define a phase of the local bus during execution of a given transaction in known fashion. The control/data signal, which is sourced by the target device, also indicates whether control or data information is on the data signal lines. The input/output signal line, which is sourced by the target device, also controls the direction of data movement on the local bus relative to an initiator device; further, this signal line can also be used to distinguish selection and reselection phases. The message signal is sourced by the target device to indicate the message phase.

In accordance with the present invention, separate input/output bus reset signal lines 148, 150 are provided for sending and receiving reset signals. Similarly, separate output/input request signal lines 152, 154 and separate output/input acknowledge signal lines 156, 158 are provided to send and receive request and acknowledge signals during information transfer. The use of separate input and output signal lines can be used to provide advantages as described in commonly assigned, co-pending U.S. patent application Ser. No. 0/432,817, filed May 2, 1995, still pending entitled "METHOD AND APPARATUS FOR INCREASING RELIABILITY OF INPUT/OUTPUT CONTROLLERS USING SEPARATE FILTERED AND UNFILTERED INPUTS" and U.S. patent application Ser. No. 08/432,804, filed May 2, 1995, now Pat. No. 5,694,586 entitled "METHOD AND APPARATUS FOR ENHANCING INFORMATION TRANSFER RELIABILITY OF AN INPUT/OUTPUT CONTROLLER USING TIME-DOMAIN FILTER", the disclosures of which are hereby incorporated by reference in their entireties.

In accordance with exemplary embodiments, a filtered input is used to receive information transfer signals during an asynchronous information transfer mode. Because of the high speed performance typically required for a synchronous information transfer, the unfiltered signal line is used to both send and receive the information transfer signals in a synchronous mode of information transfer.

As previously discussed, exemplary embodiments of the first controller can distinguish an asynchronous mode from a synchronous mode of information transfer by monitoring the request/acknowledge offset value. In an initial mode of information transfer, an asynchronous mode is used whereby incoming information transfer signals, such as an incoming request or acknowledge signal, are input to the first controller of FIG. 3 via their respective filtered input signal line. At either a predetermined time or at periodic intervals subsequent to initiation of the information transfer, attempts can be made to use a synchronous mode of information transfer in an effort to enhance performance. During the attempted synchronous mode of information transfer, reliable detection of the incoming information transfer signals is monitored by the bus sequencer. Such monitoring can be performed by, for example, detecting receipt of the incoming information transfer signals and incoming response-based information transfer signals (for example, deassertion of an incoming request signal subsequent to the first controller sending an acknowledge signal). If such signals have been reliably detected, then a synchronous mode of operation is retained. In this case, the unfiltered send signal line can be used to both send and receive signals when a synchronous mode of operation is used. Those skilled in the art will appreciate that where the speed of a synchronous mode is relatively slow, a filtered input signal line can be used for that mode of information transfer, if desired.

In an exemplary embodiment, the bus sequencer can enable the signal lines to be used for a given mode of information transfer. For example, in response to detecting a zero offset value, representing an asynchronous mode of information transfer, the bus sequencer can enable the input request signal line 154 to receive an incoming request signal, and enable the output signal line 152 to send any outgoing request signal (where the first controller is in target mode). However, at a predetermined time (for example, upon receipt of an information transfer command following successful arbitration and selection) or periodically, after initiation of an asynchronous mode of information transfer, the first controller can attempt to receive an incoming request signal via the unfiltered output request signal line 152. Upon reliable detection of the request signal, the bus sequencer can retain a synchronous mode of information transfer. As a result, the output request signal line 152 is used to both send and receive request signals. Those skilled in the art will appreciate that a similar operation can be applied to the acknowledge signal lines 156 and 158, or to any other information transfer signal lines which the user wishes to so configure.

In accordance with exemplary embodiments, multiple modes of synchronous information transfer can be used. For example, a fast synchronous mode of information transfer and one or more slower modes of synchronous information transfer can be used. In attempting to switch from an asynchronous mode to a synchronous mode of information transfer, the fast mode can be attempted first. If reliable detection of the information transfer signal during the fast synchronous mode of information transfer is unsuccessful, a slow mode of information transfer can be attempted. If the slow mode of synchronous information /transfer proves unreliable, then operation can return to the asynchronous mode.

Output data from the first controller 100 is provided to the second bus via an output data signal line 160 (for example, 8-bits) which can include a data parity signal line 162. An input data signal line 165 can include a data parity signal line 166.

Having described the input/output signal lines of the FIG. 3 controller, attention will now be directed to the various registers illustrated in FIG. 3. The first controller 100 can include an identification (ID) register 170 for revision identification information (i.e., a current version of the first controller's internal architecture). The first-in first-out register 172 buffers read or write information to or from a first-in first-out memory 176.

The first-in first-out memory 176 buffers data transferred between the first bus (that is, the bus interconnecting the first controller to the main controller) and the second bus (that is, the local bus of the first controller). A first-in first-out count register 174 identifies the number of bytes stored in the first-in first-out memory 176 at any given time.

Transfer count registers 178 and 180 indicate the number of bytes expected to be transferred in an information transfer phase. Bus status register 182 and 184 store the current status (that is, phase or state) of the second bus.

Exemplary embodiments include an interrupt register 186 and an interrupt mask register 188. These registers can, if desired, be used to signal an interrupt to the main controller, after which the interrupt mask register 188 can be examined (e.g., polled) to determine the cause of the interrupt in conventional fashion. However, because exemplary embodiments use the Command Done, Exception and Error status signals to monitor execution of a transaction, use of the interrupt register during in execution of a transaction can be eliminated.

A sequence register 190 is used to direct the first controller into a particular "phase" of the second bus (that is, a phase into which the second bus is expected to transaction for a given command). The target device, for any given transaction, will typically drive the phases of the local bus. Accordingly, where the first controller is in an initiator mode, the requested sequence is one expected to be entered by the target device. When the first controller is in the target mode, the phase is one which the first controller will enter next.

Bit locations of the sequence register, in accordance with exemplary embodiments, are designated as follows: (1) a first bit location indicates whether an information transfer is to be done using direct memory access; (2) a target mode bit location indicates that the first controller is to be placed into the target mode for executing a command identified within subsequent bit locations of the sequence register; this bit location is cleared when the first controller is placed into an initiator mode; (3) an attention bit location indicates, for initiator mode selection and information transfer phases, that the attention signal line will be asserted (in initiator mode) or compared against this bit (in target mode); and (4) a location (for example, four bits) which designates an encoded value of a given command to be executed. This four bit command can be decoded by the bus sequencer to identify an expected phase, or state, of the second bus.

In accordance with exemplary embodiments where the first controller is a small computer system interface, the message, control/data and input/output signals can be used to identify up to eight different information transfer phases. Six information transfer phases which are used in conjunction with the SCSI-3 protocol are: (1) a data-out phase; (2) a data-in phase; (3) a command phase; (4) a status phase; (5) a message-out phase; and (6) a message-in phase. In addition to the information transfer phases, connection phases can also be provided and include: (1) an arbitration phase; (2) a selection (or reselection) phase; and (3) a bus free phase. In accordance with exemplary embodiments, a target device continuously maintains the state of phase signals until a request is received which results in a change of state. The actual phase of the second bus is represented by actual values of the message, control/data and input/output signals, as monitored by the bus sequencer 102 for comparison with the expected phase, as decoded by the bus sequencer using the command bits stored in the sequencer register 190.

Given the foregoing phases, commands which can be encoded into the sequence register include: (1) an arbitrate command; (2) a selection command; (3) a command-phase command; (4) a status command; (5) a data-out command; (6) a data in command; (7) a message-out command; and (8) a message-in command.

The arbitrate command, during normal processing, is completed when arbitration has been won. If arbitration has been lost, the Exception is asserted. If a reset signal is asserted during execution of the arbitrate command, then the Error signal is asserted.

The arbitrate command is used to initiate arbitration for the local bus. This command places the source identification information stored in the source identification register 198 on the local bus to perform bus arbitration. If the source identification stored in the register 198 is of highest contending priority, then the first controller asserts the selection command on selection signal line 136 and arbitration has been won. However, if another device on the second bus has higher priority or has asserted its selection signal, the first controller has lost arbitration and will release its busy signal on busy signal line 132 and arbitration identification. As a result, an arbitration lost bit in the exception register 194 is set, such that the Command Done and Exception signals are asserted and an interrupt generated.

The selection command, during normal operation, is completed when a designated destination has been selected. However, if the time in the select time-out register is exhausted, then the Command Done and Exception signals are asserted. The Error signal is asserted during execution of the selection command if a reset signal is asserted.

The selection command is executed when arbitration has been won. To effect a selection command, the first controller asserts the identification indicated in the destination identification register 200, along with a source identification from the source identification register 198, and then deasserts the busy signal on busy signal line 132. The first controller waits, for the time specified in the select time-out register 196, for the busy signal to be asserted by the destination device. If the attention bit of the sequence register has been set, the attention signal is asserted before releasing the busy signal. If the first controller is in the target mode, then the input/output signal is asserted and a reselection phase is entered.

Once a destination has been selected, an information transfer command, or service, can be used to initiate information transfer. The command phase command, status command, data-out command, data-in command, message-out command and message-in command constitute information transfer commands. In normal operation, these commands are executed until the transfer count stored in the transfer count register has been exhausted.

For example, when command information is to be transferred from an initiator device to a target device, a command request is received by the target device. In accordance with standard SCSI-3 protocol, a command phase is identified by the target device asserting the control/data signal and negating the message and input/output signals. In response, the initiator places the command information on the data bus and begins an information transfer.

The status service is used to transfer status information from the target device to the initiator device. The data-out service is used to transfer data from the initiator device to the target device. The data-in service is used to transfer data from the target device to the initiator device. The message-out and message-in services are used to transfer a message from the initiator device to the target device or vice versa. For any of the information transfer commands, if the attention flag is set, the attention signal is asserted before negating the acknowledge signal; if the attention flag is cleared, the attention signal is negated prior to asserting the acknowledge signal.

As mentioned above, information transfer commands are executed until the transfer count stored in the transfer count registers is exhausted. However, execution of these commands can be discontinued if: an Exception signal is asserted in response to a phase mismatch; or an Error signal is asserted. If during execution of the information transfer commands, a phase mismatch is detected, the Exception signal is asserted. If during execution of any of these data transfer commands, the reset signal becomes active, then the Error signal is asserted. The Error signal is also asserted during execution of the status command, the data-in command or the message-in command if a parity error is detected.

A phase mismatch of a small computer system interface bus can be detected in any number of ways. For example, the bus sequencer can compare the current phase of the local bus, as determined by the bus sequencer monitoring the message, control/data and input/output signal lines, with a phase of the bus expected by the bus sequencer 102 as determined by decoding the command issued by the main controller and stored in the sequence register. If the bus sequencer determines that the expected phase and actual phase of the second bus do not match, the bus sequencer indicates that a phase mismatch has occurred by setting a flag in the exception register 194.

A phase mismatch can also be identified if, during information transfer, the target mode bit of the sequence register is set such that the first controller sets the local bus phase status signals (i.e., the message, command data and input/output commands) to the appropriate state and uses the request/acknowledge signals for information transfer. In the target mode, the attention bit in the sequence register can be used be as a phase comparison bit during execution of an information transfer command. The attention bit can be compared against the attention signal on attention signal line 140 at a trailing edge of the acknowledge signal. If the state of the attention bit in the sequence register does not match that of the attention signal on a trailing edge of the acknowledge signal, a phase mismatch is detected and used to assert an Exception signal. At that time, the transfer of data can be discontinued and a message-out phase entered for the purpose of allowing an initiator device-to-target device information transfer.

In addition to identifying a given command to be executed, the sequence register also can include bit locations to designate a bus free condition of the local bus. A bus free condition is used to indicate that the local bus is expected to transition to a bus free phase, wherein the busy and selection signals are both false. Note that upon completion of a transaction, the busy signal is cleared. If a phase mismatch is detected during transition to a bus free condition, the Exception signal is asserted. If a reset signal is asserted during execution of a bus free condition, then the Error signal is asserted.

When the first controller is in an initiator mode, before the bus free condition is indicated, the acknowledge signal will be negated and then the busy signal is expected to go false. If the first controller detects a request has been asserted before the busy signal goes false, then the phase mismatch bit will be set and an Exception signal is asserted. If the transfer mode bit is set, the first controller will release the busy signal from the bus.

In addition to the sequence register 190 described above, the first controller 100 also includes an error register 192 for storing an error status and the exception register 194 for storing an exception status. Further, the first controller includes a selection time-out (TO) register 196 for storing a selection time-out condition, the source identification register 198 for storing a bus identification of the first controller (that is, for use during arbitration), the destination identification register 200 for storing an identification of a device to be selected or reselected, and a synchronization register 202 for storing synchronization parameters used in conjunction with a synchronization mode, depending on the speed with which information is to be transferred.

The Command Done signal is used as a status signal for indicating when a given command has been completed by the first controller. When the command has not been properly executed, the Exception register, the Error register and the interrupt register are used to supply such additional status information.

More particularly, the exception register 194 identifies conditions which are usually not errors, but which can cause the sequence to stop for processor intervention. The exception register is cleared by writing the register with 1's in the bits to be cleared or by writing a 1 in the exception bit location in the interrupt register.

The exception register 194 includes, for example, any one or more of: (1) a bit location which is set if the first controller has been selected as a target and the attention signal on the second bus has been asserted; (2) a bit location which is set if the first controller has been selected as a target and the attention signal was not asserted at the time of selection; when set, this bit location indicates that the target device identification and initiator device identification are stored in the last byte of the first-in first-out memory 176; (3) a reselected bit location which is set if the first controller is reselected as a host; when set, the target device identification and the initiator device identification are stored in the last byte of the first-in first-out memory 176; (4) a phase mismatch bit location which is set if a certain phase was expected but another phase is driven by the target device; when set, the bus status register 182 can be interrogated to determine the current phase of the bus and to take appropriate action (that is, generate an Exception signal); and (5) a select time-out bit which is set if the time indicated within the selection time-out register has exhausted prior to the destination device being selected.

The error register 192 includes bits which indicate when various error conditions are TRUE. This register is cleared by writing 1's to the bits to be cleared or by writing a 1 to an error bit in the interrupt register. In an exemplary embodiment, this register includes any one or more of: (1) a bit location to indicate that a target device released the busy signal somewhere between a successful selection and the issuing of a bus free command; (2) a reset signal bit location to indicate whether the reset signal was or is asserted as a reset interrupt; after receiving the reset interrupt, the bus reset signal (bit 7 of bus status register 182) is polled until reset goes away; (3) a sequence error bit location to indicate that a command was issued to the first controller while an Exception or Error signal was pending; and (4) parity error bit locations which indicate if, for example, the calculated parity of incoming data does not match the parity bit supplied on incoming data parity signal line 166.

The interrupt mask register 186 is used to mask out interrupts from any or all of the interrupt sources. The interrupt register combines a status of the Error, Exception and Command Done signals into one interrupt source. More particularly, the error bit of the interrupt register represents that the Error signal has been set. An Exception bit is used to indicate when the exception signal is set, and a command done bit is used to indicate that the Command Done signal has been set.

Those skilled in the art will appreciate that the exemplary embodiment of FIG. 3, as described with respect to a small computer system interface is by way of example only, and that features of the present invention can be implemented with any protocol-based controller means. Further, those skilled in the art will appreciate that the first controller can exploit features of the present invention regardless of whether it operates in an initiator mode or in a target mode.

Thus, in accordance with exemplary embodiments, means such as at least two signal lines are provided for sending and receiving at least first and second information transfer signals during a transfer of information between the controller and the at least one peripheral device, the second information transfer signal being generated in response to said first information transfer signal.

FIG. 4 illustrates an exemplary means, such as a state machine and output latch, which can be used for producing an information transfer signal in response to an initial signal. For example, the exemplary FIG. 4 output latch circuit can produce an acknowledge signal in response to receipt of a input request signal. Those skilled in the art will appreciate that an information transfer signal can be received using, for example, exemplary embodiments as described in commonly assigned, copending U.S. application Ser. No. 08/432,817, filed May 2, 1995, still pending entitled "METHOD AND APPARATUS FOR INCREASING RELIABILITY OF INPUT/OUTPUT CONTROLLERS USING SEPARATE FILTERED AND UNFILTERED INPUTS" and U.S. patent application Ser. No. 08/432,804, filed May 2, 1995, now Pat. No. 5,694,586 entitled METHOD AND APPARATUS FOR ENHANCING INFORMATION TRANSFER RELIABILITY OF AN INPUT/OUTPUT CONTROLLER USING TIME-DOMAIN FILTER", the disclosures of which are hereby incorporated by reference in their entireties.

The exemplary FIG. 4 embodiment includes a flow through latch 402 which can include a D input 404 and an enable signal line 406. Those skilled in the art will appreciate that the flow through latch only supplies the data input to the output when the enable input is asserted. The output is then retained (that is, latched) until another enable signal is received.

Thus, in response to the input and enable signal lines, the latch 402 produces an output signal on an output signal line 408. For purposes of illustration, The FIG. 4 latch will be described in the context of a small computer system interface operating in an initiator mode, wherein a request signal is received from a target device.

In response to the request signal the initiator device must supply an acknowledge signal during a synchronous transfer of information. In contrast to use of a conventional dual rank synchronizer, which incurs a minimum of two clock period delays in generating the acknowledge signal, the exemplary FIG. 4 embodiment can produce the acknowledge signal much more efficiently, thereby enhancing overall operation of the information transfer. In exemplary embodiments, the acknowledge signal can be produced upon detection of the request signal, without any clock delay.

To produce the acknowledge signal using the FIG. 4 latch circuitry, the D input 404 receives an output from a state machine 410. As referenced herein, a state machine can be any hardware or software controlled device, such as any counter, memory or look-up table, that can produce predetermined logic outputs in response to given input conditions, and that can be included within or provided external to the small computer system interface. The internal state machine of FIG. 4 can, of course, include conventional control (e.g., enable) and reset inputs.

The internal state machine 410, in an initial state, produces an output which can be used in conjunction with the input request signal to provide an enable signal for latch 402. The state machine receives a clock signal on clock signal line 412. The internal state machine 410 also receives a synchronized acknowledge signal which is generated using a first sampling circuit, for example, a conventional dual rank synchronizer 432, that receives the acknowledge signal at its input. Similarly, a synchronized request signal can be reproduced at an input 416 of the state machine using, for example, a second sampling circuit, such as a dual rank synchronizer 434, which receives the input request signal.

Outputs of the internal state machine 410 include an acknowledge output data signal labelled ACKOUTDATA, on an acknowledge output data signal line 422. An output enable request TRUE/acknowledge TRUE signal line 420 produces an output labelled ENRqTAckT. An output signal line 418 of the internal state machine produces an enable request FALSE/acknowledge FALSE signal labelled EnRqFAckF.

In FIG. 4, the enable signal line 406 of the latch 402 includes a logic circuit 424. The logic circuit can be formed with two AND gates 426 and 428, whose outputs are supplied to an OR gate 430. The output of OR gate 430 is supplied to the enable signal line 406. The first AND gate 426 receives the enable request FALSE/acknowledge FALSE signal on output signal line 418 of the internal state machine. An inverted second input of the AND gate 426 receives the input request signal. The second AND gate 428 receives the input request signal in its non-inverted state. The second input of the second AND gate 428 receives the enable request TRUE/acknowledge TRUE signal.

FIGS. 5A–G indicate the generation of the output signals from the internal state machine 410 for a small computer system interface operating in an initiator mode, where upon receipt of an input request signal, an output acknowledge signal is generated. In FIGS. 5A–G, at a time $t_1$, the small computer system interface has determined that a transfer of information should occur, such that an enable signal can be supplied to the internal state machine 410 to set the acknowledge out data signal (FIG. 5B) to a TRUE state (e.g., for simplicity, all TRUE states of the exemplary embodiment described have been shown as logic level 1; note that active level low signals can also be used) as a data input to input signal line 404 of the latch 402. The acknowledge out data signal is used to generate the acknowledge output signal on an output signal line 408 of FIG. 4 when the latch becomes enabled. The flow of the acknowledge output data signal through the latch is achieved by partially enabling the latch with a setting of the enable request TRUE/acknowledge TRUE signal line to its TRUE state at $t_1$ (FIG. 5C).

At a time $t_2$, if a request input (FIG. 5A) has been received from a target device, then the input request signal goes to its TRUE logic level state to fully enable the latch. More particularly, upon receipt of the request input signal, an output is produced from the second AND gate 428 to thereby supply an enable signal on the enable signal line 406 to the latch 402. The acknowledge out data supplied on the input signal line 404 of the latch therefore flows to the output signal line 408 to provide the acknowledge signal (FIG. 5E) with a minimum delay following the rising edge of the input request signal.

Note that the acknowledge signal can be generated without awaiting a subsequent clock pulse on clock signal line 412 (FIG. 5G) following receipt of the request signal. Meta-stabilities of the request signal which may occur at the clocking of the request signal into the state machine 410 do not affect the generation of the acknowledge signal. This is because generation of the acknowledge signal is not dependent on a change of state of the state machine in response to receipt of the request signal. Thus, a two clock delay is not incurred in generating an acknowledge signal in response to a request signal.

At a time $t_{2a}$, a synchronized acknowledge signal (FIG. 5F), which is generated in response to the acknowledge signal (FIG. 5E) via use of dual rank synchronizer 432, is driven to its TRUE state. This signal is driven to its TRUE state, in an exemplary embodiment, two clock pulses subsequent to the acknowledge signal becoming TRUE. Upon detecting the synchronized acknowledge signal, the internal state machine can place the enable request FALSE/ acknowledge FALSE signal into its TRUE state at a time $t_4$. This time from the output acknowledge signal changing to the time the input request signal is negated is often greater than the time used by the state machine to set up the EnReqFAckF and AckOutData signals, such that system performance is not degraded.

At a time $t_3$, subsequent to receipt of the request, acknowledge and synchronized acknowledge signals being TRUE, the enable request TRUE/acknowledge TRUE signal is set FALSE by the internal state machine. Alternately, for example, the enable request TRUE/acknowledge TRUE signal can be performed once the synchronized acknowledge or synchronized request is found to be TRUE.

One clock period later, at a time $t_4$, the acknowledge output data signal from the internal state machine can be changed in preparation for the input request signal going to its FALSE state. At the same time, an enable request FALSE/acknowledge FALSE signal (FIG. 5D) can be set to its TRUE state so that when the target device sets the request signal FALSE, the acknowledge signal can be set FALSE. By setting the enable request FALSE/acknowledge FALSE signal to a TRUE state, a TRUE logic level high signal is placed on the input to the first AND gate 426. Thus, when the input request signal is set FALSE, the latch will be enabled.

At a time $t_5$, the request signal (FIG. 5A) goes to its FALSE state, thereby enabling the latch via the AND gate 426 and OR gate 430. A logic level low of the acknowledge output data signal, which is supplied to the D input 404 of the latch, is therefore supplied on the output signal line 408 for placement on the bus of the small computer system interface.

At a time $t_{5a}$, a synchronized acknowledge signal (FIG. 5F), which is generated in response to the acknowledge signal (FIG. 5E) via use of dual rank synchronizer 432, returns to a logic level low state. The signal was driven to its TRUE state two clock pulses subsequent to the acknowledge signal being set. Upon detecting the synchronized acknowledge signal as FALSE, the internal state machine can place the enable request FALSE/acknowledge FALSE signal into its TRUE state at a time $t_6$.

In summary, the exemplary embodiment described with respect to FIG. 4 can eliminate the time delays associated with generating a second information transfer signal, such as an acknowledge signal, in response to a first information transfer signal, such as a request signal. Similarly, a clock delay can be eliminated in generating a FALSE acknowledge signal subsequent to a request signal being preset FALSE.

The foregoing operation has been described in the context of a small computer system interface operating in an initiator mode. However, those skilled in the art will appreciate that exemplary embodiments of the present invention can be applied to the generation of any information transfer signal which is generated in response to receipt of the active edge (that is, the rising or falling of a leading or trailing edge) of another information transfer signal. The exemplary circuitry illustrated in the FIG. 4 embodiment can, for example, respond to an acknowledge signal to reset the request signal FALSE when the controller is operating in a target mode. Exemplary embodiments of the present invention thus overcome the delays associated with conventional circuitry used for generating a responsive information transfer signal.

Figure 6A:
FIGS. 6A–6C and 7A–7E illustrate timing diagrams in accordance with an alternate embodiment.
Figure 6B:
Figure 6C:

Despite the foregoing advantages, the ability to generate an information transfer signal (such as an acknowledge signal) in response to receipt of an earlier signal (such as a request signal) without awaiting a subsequent clock pulse can lead to operational errors if certain conditions are not taken into account by using synchronized inputs to the state machine. For example, FIGS. 6A–6C illustrate a condition which could result in an error condition. In FIG. 6A, a request signal is received subsequent to receipt of a clock pulse. Prior to receipt of the next clock pulse, the acknowledge signal (FIG. 6C) is quickly driven to its TRUE state via the latch circuitry of FIG. 4.

If, as in the FIG. 6 example the request signal is driven back to its FALSE state before receipt of the next clock pulse, the request signal is never detected by the internal state machine. Such a condition can occur if, for example, the target device which generated the request signal immediately drives the request signal to its FALSE state upon detecting the acknowledge signal. The failure of the state machine to detect the request signal can result in operational error, since resetting of the acknowledge signal FALSE depends on detecting that the request signal is FALSE by the state machine.

However, in accordance with the exemplary FIG. 4 embodiment, such operational errors do not occur. More particularly, the FIG. 4 embodiment can use the synchronized acknowledge signal as an input to the state machine for resetting the acknowledge signal FALSE. The synchronized acknowledge signal is maintained in its TRUE logic state for multiple clock cycles. Thus, the FIG. 4 latch circuitry can generate the acknowledge signal in response to a rising edge of the request signal without concern that the request signal will be reset FALSE before the next clock pulse. Consequently, the acknowledge signal can be generated one full clock period earlier without the potential for an operational error.

Figure 7A:
Figure 7B:
Figure 7C:
Figure 7D:
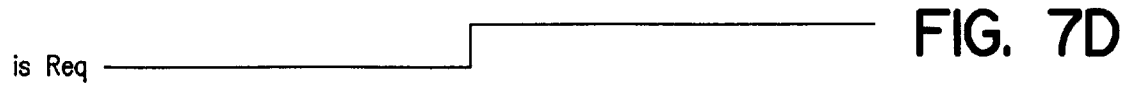
Figure 7E:
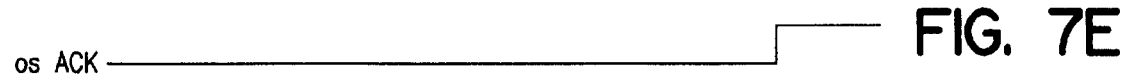

FIGS. 7A–7E illustrate another condition which could cause a potential operational delay due to the speed with which an information transfer signal, such as the acknowledge signal of FIG. 5E is generated. In FIGS. 7A–7C, a clock pulse is generated between receipt of a request signal (FIG. 7A) and generation of an acknowledge signal (FIG. 7B). However, the request signal is returned to its FALSE state before receipt of the next clock pulse. Thus, although the state machine will detect the request signal, the acknowledge signal is not TRUE at the time the clock pulse was received. Thus, a delay would ordinarily be incurred in detecting the acknowledge signal by the state machine, which in turn would delay resetting the request signal FALSE.

However, in accordance with exemplary embodiments, a synchronized request signal can be generated using the dual rank synchronizer 434 of FIG. 4. The synchronized request signal, which in the exemplary FIG. 4 embodiment occurs two rising clock edges after the request signal, can then be used by the state machine to determine the occurrence of the acknowledge signal and continue on to the next state. That is, either the acknowledge signal itself or the synchronized request signal, in conjunction with the input request signal, can be used to reset the enable request TRUE/acknowledge TRUE signal. For the condition illustrated in FIGS. 7A–7E, the use of the synchronized request will result in earlier resetting of this output from the state machine Those skilled in the art will appreciate that the foregoing examples are by way of illustration only and that any number of alternative embodiments can be used. For example, in place of using the logic circuit illustrated in the exemplary FIG. 4 embodiment, those skilled in the art will appreciate that a multiplexer could also be used. For example, a multiplexer could be configured to receive the enable request FALSE/acknowledge FALSE signal at one input and the enable request TRUE/acknowledge TRUE signal at its other input. A select input of the multiplexer could be controlled in response to a state of the input request signal. A similar multiplexer could be used for a small computer system interface configured operating in a target mode.

It will be appreciated by those skilled in the art that the present invention can be embodied in other specific forms without departing from the spirit or essential characteristics thereof. The presently disclosed embodiments are therefore considered in all respects to be illustrative and not restricted. The scope of the invention is indicated by the appended claims rather than the foregoing description and all changes that come within the meaning and range and equivalence thereof are intended to be embraced therein.

What is claimed is:

1. Apparatus for controlling a transfer of information between a controller and at least one peripheral device, said apparatus comprising:

at least two signal lines connected to at least one of the at least one peripheral device and the controller for sending and receiving at least first and second information transfer signals during a transfer of information between the controller and the at least one peripheral device, said second information transfer signal being generated in response to said first information transfer signal;

a state device for receiving at least one of said information transfer signals as an input, and for generating at least one latch enable signal in response to said at least one information transfer signal; and a latching circuit for producing said second information transfer signal in response to said latch enable signal.

2. Apparatus according to claim 1, wherein said apparatus is a small computer system interface, wherein said first information transfer signal is a request signal and said second information transfer signal is an acknowledge signal.

3. Apparatus according to claim 1, wherein said apparatus is a small computer system interface, wherein said first information transfer signal is an acknowledge signal and said second information transfer signal is a request signal.

4. Apparatus according to claim 1, wherein said state device further includes:

a look-up table.

5. Apparatus according to claim 1, wherein said latching circuit further includes:

a flip-flop for producing said second information transfer signal in response to said at least one latch enable signal and in response to a second output signal of said state device.

6. Apparatus according to claim 1, further including:

a logic circuit for logically combining said first information transfer signal with said at least one latch enable signal generated by said state device.

7. Apparatus according to claim 6, wherein said logic circuit further includes:

at least one AND gate and at least one OR gate.

8. Apparatus according to claim 1, further including:

at least one dual rank synchronizer for receiving one of said first and second information transfer signals and for producing a synchronized information transfer signal for input to said state device.

9. Apparatus according to claim 1, further including:

a first sampling circuit for synchronizing receipt of said first information transfer signal; and a second sampling circuit for synchronizing receipt of said second information transfer signal.

10. Apparatus according to claim 9, wherein each of said first and second sampling circuits are dual-rank synchronizer circuits.

11. Method for controlling a transfer of information between a controller and at least one peripheral device, comprising the steps of:

receiving a first information transfer signal from one of the at least one peripheral device and the controller during a transfer of information between the controller and the at least one peripheral device;

sending a second information transfer signal to the one of the at least one peripheral device and the controller in response to said first information transfer signal;

generating at least one latch enable signal in response to said first information transfer signal; and producing said second information transfer signal in response to said latch enable signal.

12. Method according to claim 11, wherein said first information transfer signal is a request signal and said second information transfer signal is an acknowledge signal.

13. Method according to claim 11, wherein said first information transfer signal is an acknowledge signal and said second information transfer signal is a request signal.

14. Method according to claim 11, further including the steps of:

sampling said first information transfer signal to synchronize said first information transfer signal to a given clock; and sampling said second information transfer signal to synchronize said second information transfer signal to said given clock.

15. Method according to claim 11, wherein said first and second information transfer signals are received and sent during an asynchronous information transfer operation.

16. Method according to claim 11, wherein said first and second information transfer signals are received and sent during a synchronous information transfer operation.

17. Apparatus for controlling a transfer of information between a first device and a second device, said apparatus comprising:

at least one signal line for sending and receiving at least first and second information transfer signals to and from at least one of the first and second devices during a transfer of information between the first device and the second device, said second information transfer signal being generated in response to said first information transfer signal;

a state device for receiving at least one of said information transfer signals as an input, and for generating at least one latch enable signal in response to said at least one information transfer signal; and a latching circuit for producing said second information transfer signal on the at least one signal line in response to said latch enable signal, wherein said latching circuit further includes a logic circuit for logically combining said at least one information transfer signal with said at least one latch enable signal generated by said state device.

18. Apparatus according to claim 17, further including:

a flip-flop for producing said second information transfer signal in response to said at least one latch enable signal and in response to a second output signal of said state device.

19. Apparatus according to claim 18, further including:

a first sampling circuit for synchronizing receipt of said first information transfer signal; and a second sampling circuit for synchronizing receipt of said second information transfer signal.

20. Apparatus according to claim 19, wherein each of said first and second sampling circuits are dual-rank synchronizer circuits.

* * * * *